United States Patent [19]
Glauber

[11] Patent Number: 5,909,909
[45] Date of Patent: Jun. 8, 1999

[54] SYSTEM FOR INSTALLING O-RING

[76] Inventor: Carl J. Glauber, 5825 Invincible Dr., Jamesville, N.Y. 13078

[21] Appl. No.: 08/925,246
[22] Filed: Sep. 8, 1997
[51] Int. Cl.⁶ .................................................. B23P 19/02
[52] U.S. Cl. ............................................................ 29/235
[58] Field of Search ............................... 29/235, 280, 282

[56] References Cited

U.S. PATENT DOCUMENTS

| 3,639,972 | 2/1972 | Schelin et al. | 29/451 |
| 4,719,684 | 1/1988 | Mutter | 29/235 |

Primary Examiner—Timothy V. Eley
Assistant Examiner—Benjamin M. Halpern
Attorney, Agent, or Firm—Robert J. Bird

[57] ABSTRACT

A system for inserting O-rings into axially spaced annular grooves in a cylindrical cavity includes a cylinder for insertion to a limited extent into the cavity from one end, with a rod extending from the cylinder through the cavity; a sleeve for insertion to a limited extent into the cavity from the other end; spacer rings for selective mounting on the cylinder and the sleeve to selectively position the cylinder and sleeve relative to the cavity, whereby to cover all but one of the annular grooves within the cavity. A tube fits into the sleeve and over the rod to push an O-ring along the rod and into the one annular groove left exposed by the cylinder and sleeve.

3 Claims, 2 Drawing Sheets

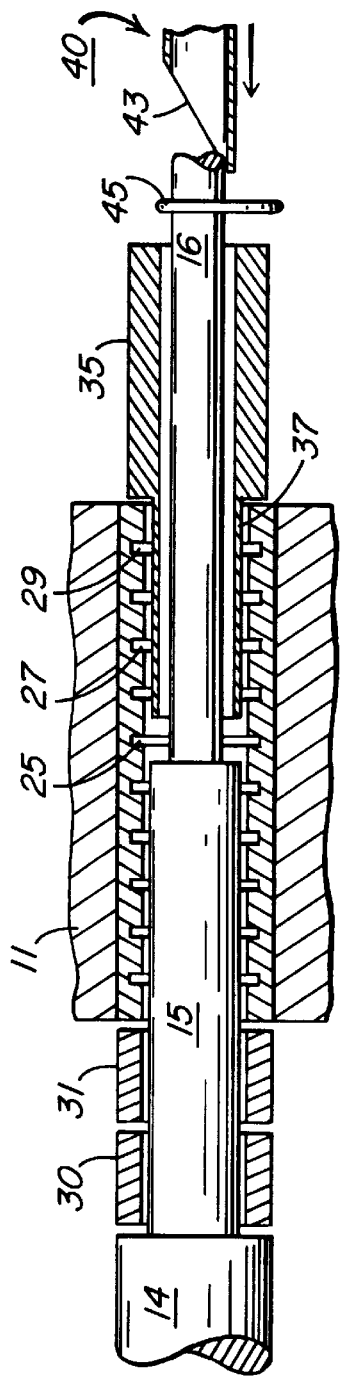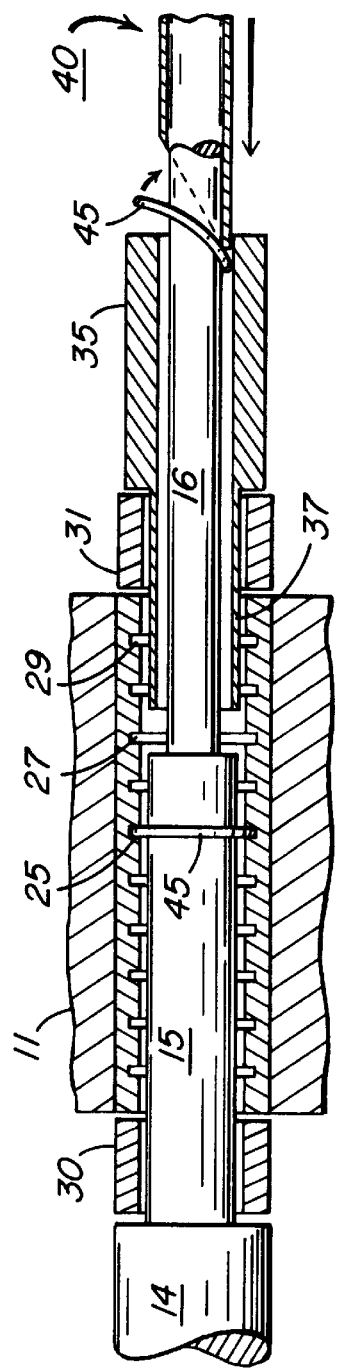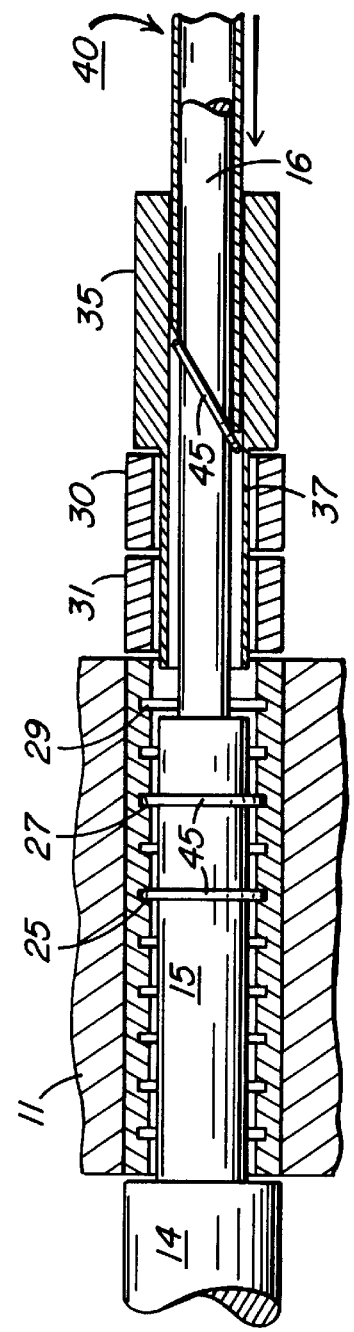

SYSTEM FOR INSTALLING O-RING

FIELD OF THE INVENTION

This invention is a method and apparatus for inserting O-rings into internal annular grooves.

BACKGROUND OF THE INVENTION

O-rings are in common use for many sealing applications. Directional control valves provide one example of their use. Directional control valves direct the flow of pneumatic or hydraulic fluid to and from cylinders, fluid motors, or other actuating units. A directional control valve typically includes a spool axially movable within a cylindrical cavity to open and close various passages in the valve body. The cylindrical cavity includes a number of axially spaced annular grooves with O-rings set into some of them. The valve spool is movable axially back and forth within the cylindrical cavity and through the O-rings.

O-rings are subject to damage and wear and, depending on operating conditions, must be replaced from time to time. Heretofore, this has been a painstaking job requiring forceps or other such tools and fingers to manipulate an O-ring axially into the cylindrical cavity until it seats itself in its annular groove. Some control valves have a number of annular grooves. Some of the grooves are for O-rings, and some are fluid passages. In such a case, the placement of O-rings in their proper grooves is not only tedious and time consuming, but also critical.

SUMMARY OF THE INVENTION

This invention is a system for inserting O-rings into axially spaced annular grooves in a cylindrical cavity. It includes a cylinder for insertion to a limited extent into the cavity from one end, with an axial rod extending from the cylinder through the cavity; a sleeve for insertion to a limited extent into the cavity from the other end; spacer rings for selective mounting on the cylinder and the sleeve to selectively position the cylinder and sleeve relative to the cavity, whereby to cover all but one of the annular grooves within the cavity. A tube fits into the sleeve and over the rod to push an O-ring along the rod and into the one annular groove left exposed by the cylinder and the sleeve.

DRAWING

FIGS. 6, 7, 8 illustrate the use of the elements shown in FIGS. 1–5 to insert O-rings into axially spaced annular grooves in a cylindrical cavity.

DESCRIPTION

Figure 1:
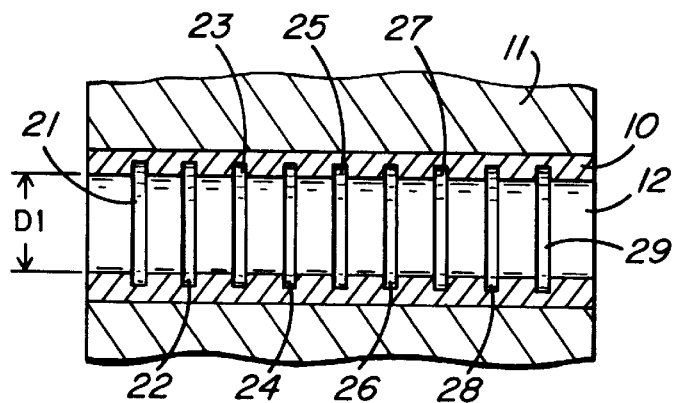
FIG. 1 is a sectional view representing a cylindrical valve cavity.

FIG. 1 represents a valve body 10 mounted, for example, in the center block 11 of a diaphragm pump. The valve body 10 includes a cylindrical cavity 12 of a diameter D1 and including axially spaced annular grooves 21–29. In this example, the odd numbered grooves 21, 23, 25, 27, 29 are O-ring seats. The even numbered grooves 22, 24, 26, 28 between O-ring seats are fluid passages.

Figure 2:
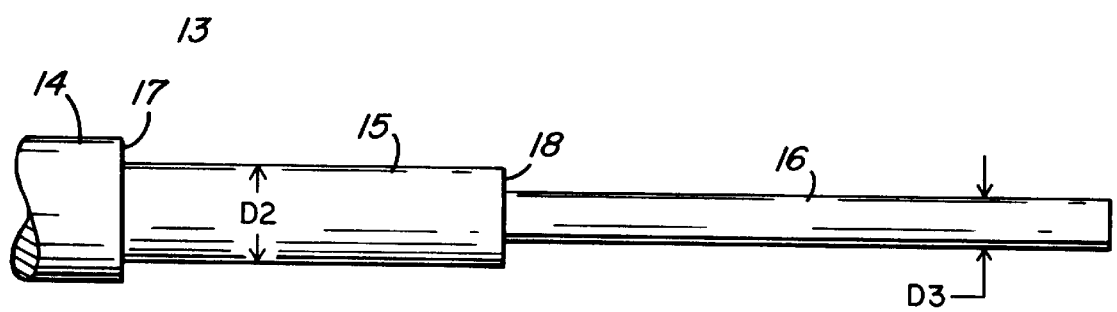
FIG. 2 is a side view of a positioning rod.

FIG. 2 shows a positioning rod 13 which includes a handle 14 at one end, a central cylinder section 15 of a diameter D2, just smaller than D1 of the cavity 12 so as to fit into it, and a rod extension 16 of a still smaller diameter D3 at the other end. The end of the handle 14 at the central cylinder 15 is an annular abutment surface 17. The end of the central cylinder 15 at the rod extension 16 is an annular abutment surface 18.

Figure 3:
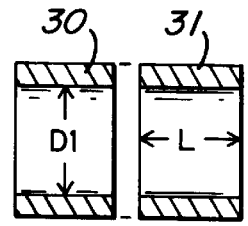
FIG. 3 is a sectional view of a pair of spacer rings.

FIG. 3 shows, in section, a pair of spacer rings 30, 31, each having an inside diameter D1 (same as the cavity 12), and length L equal to the center-to-center spacing of the O-ring grooves 21, 23, etc.

Figure 4:
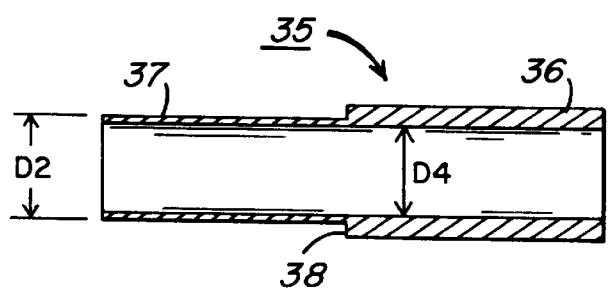
FIG. 4 is a sectional view of an O-ring insertion sleeve.

FIG. 4 shows a cylindrical O-ring insertion bushing 35 which includes a handle portion 36 at one end, a thin walled sleeve 37 at the other, and an annular abutment surface 38 at the juncture of handle 36 and sleeve 37. The sleeve 37 has the same outside diameter D2 as the cylinder section 15, to similarly fit into the cavity 12, and an inside diameter D4.

Figure 5:
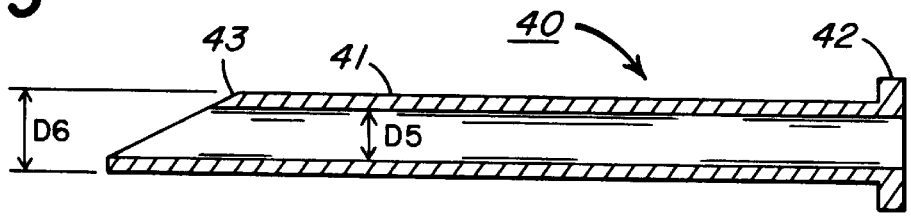
FIG. 5 is a sectional view of a push rod.

In FIG. 5, a push rod 40 includes an elongated tube 41 with an inside diameter D5 and an outside diameter D6. Inside diameter D5 of the tube 41 is larger than D3 so the tube 41 fits over the extension 16 of the positioning rod 13. Outside diameter D6 of the tube 41 is smaller than D4 so the tube fits into the sleeve 37 of bushing 35. One end of the tube 41 is a working surface 43 in a plane inclined relative to the axis of the tube. The push rod 40 also includes a suitable handle 42 on the other end. FIGS. 6, 7, 8 illustrate, in sequence, the installation of O-rings into the annular grooves 21, 23, 25, 27, 29 by means of the elements described above.

In FIG. 6, two spacer rings 30, 31 are mounted on the positioning rod 13 against the handle 14. The remaining exposed portion of the central cylinder 15 is inserted into the cylindrical valve cavity 12, with the rod extension 16 extending through and beyond the valve cavity 12. The annular abutment surface 18 of the central cylinder 15 is immediately left of the annular groove 25. At the other end of the valve cavity 12, the sleeve 37 of the insertion bushing 35 is inserted into the valve cavity 12, over the positioning rod extension 16. The inner end of the sleeve 37 is immediately right of the annular groove 25. The combined effect of the central cylinder 15 inserted in one end of the valve cavity, and the sleeve 37 inserted in the other end, is to expose one of the annular grooves (groove 25 in this case) and to cover all others. An O-ring 45 is placed on the rod extension 16 and pushed along it, into the sleeve 37, by the push rod 40 (which fits over the rod extension 16 and into the sleeve 37). The O-ring 45 is somewhat larger than the rod 16. The inclined end surface 43 of the push rod is 40 causes the O-ring 45 to incline (as shown), in order to fit within the sleeve 37. The push rod 40 moves the O-ring 45 through the sleeve 37 and into the annular groove 25. Thumb and forefinger rotation of the push rod 40 and its working surface 43 insures a good seating of the O-ring in the groove 25. In FIG. 7, one spacer ring 30 is mounted on the positioning rod 13 against the handle 14, and the exposed portion of the central cylinder 15 is again inserted into the cylindrical valve cavity 12. The annular abutment surface 18 of the central cylinder 15 is immediately left of the annular groove 27. On the other end, spacer ring 31 is mounted on the sleeve 37 which is then inserted into the valve cavity 12, over the positioning rod extension 16. The inner end of the sleeve 37 is immediately right of the annular groove 27. Here, the combined effect of the central cylinder 15 and the sleeve 37 is to expose the annular groove 27 and to cover all the others. The push rod 40 again moves an O-ring 45 into place in the annular groove 27.

In FIG. 8, the entire central cylinder 15 is inserted into the cylindrical valve cavity 12, and its annular abutment surface 18 is immediately left of the annular groove 29. On the other end, both spacer rings 30, 31 are mounted on the sleeve 37 which is then inserted into the valve cavity 12, over the positioning rod extension 16. The inner end of the sleeve 37 is immediately right of the annular groove 29. Here, the combined effect of the central cylinder 15 and the sleeve 37 is to expose the annular groove 29 and to cover all the others. The push rod 40 again moves an O-ring 45 into place in the annular groove 29. To insert O-rings into annular grooves 23 and 21, turn the valve body 10 around (as if rotated 180° on a vertical axis) and repeat the procedures of FIGS. 7 and 8 respectively.

The configurations of FIGS. 6, 7, and 8 differ only in the placement of the spacer rings 30, 31. The removal (or addition) of a spacer ring on the left side moves the central cylinder 15 to the right (or left) by an amount equal to the center-to-center spacing of the O-ring grooves. Correspondingly, the addition (or removal) of a spacer ring on the right side moves the sleeve 37 to the right (or left) by the same amount. The foregoing description of a preferred embodiment of this invention, including any dimensions, angles, or proportions, is intended as illustrative. For example, the valve body shown in the drawing is simplified for the sake of illustration and description. A real valve might have annular grooves not so evenly spaced, for example, in which case, the spacer rings might not all be the same size. Furthermore, while spacer rings are my presently preferred means for positioning the several pieces, other expedients such as detents or pin stops might be used for the same purpose. All such known devices are within the scope of this invention. The concept and scope of the invention are limited only by the following claims and equivalents thereof.

What is claimed is:

1. Apparatus for inserting O-rings into axially spaced annular grooves in a cylindrical cavity, including:
    a cylinder for insertion to a limited extent into said cavity from one end thereof, and an axial rod extending from said cylinder through said cavity;
    a sleeve for insertion to a limited extent into said cavity from the other end thereof;
    means to selectively position said cylinder and said sleeve relative to said cavity whereby said cylinder and said sleeve cover all but one of said annular grooves within said cavity leaving one annular groove exposed; and
    a tube for insertion into said sleeve and over said rod to push an O-ring along said rod and into said one of said annular grooves left exposed by said central cylinder and said sleeve.

2. Apparatus for inserting O-rings into axially spaced annular grooves in a cylindrical cavity, including:
    a cylinder for insertion to a limited extent into said cavity from one end thereof, and an axial rod extending from said cylinder through said cavity;
    a sleeve for insertion to a limited extent into said cavity from the other end thereof;
    a spacer ring for selective mounting on said cylinder and said sleeve to selectively position, respectively, said cylinder and said sleeve relative to said cavity, whereby said cylinder and said sleeve cover all but one of said annular grooves within said cavity, leaving one annular grooved exposed; and
    a tube for insertion into said sleeve and over said rod to push an O-ring along said rod and into said one of said annular grooves left exposed by said central cylinder and said sleeve.

3. Apparatus for inserting O-rings into axially spaced annular grooves in a cylindrical cavity, including:
    a positioning rod including a handle, a central cylinder for insertion to a limited extent into said cavity from one end thereof, and an axial rod extension from said central cylinder;
    an insertion bushing including a handle and a sleeve for insertion to a limited extent into said cavity from the other end thereof;
    a spacer ring for selective mounting on said central cylinder and said sleeve to selectively position, respectively, said central cylinder and said sleeve relative to said cavity and said grooves, whereby said central cylinder and said sleeve cover all but one of said annular grooves within said cavity, leaving one annular grooved exposed; and
    a push rod including a tube for insertion into said sleeve and over said rod extension to push an O-ring along said rod extension and into said one of said annular grooves left exposed by said central cylinder and said sleeve.

* * * * *